United States Patent
Baik et al.

(10) Patent No.: US 8,014,619 B2
(45) Date of Patent: Sep. 6, 2011

(54) METHOD AND APPARATUS FOR ENCODING/DECODING AN IMAGE

(75) Inventors: Hyun-ki Baik, Seongnam-si (KR); Nyeong-kyu Kwon, Daejeon (KR); Kiran Varaganti, Daejeon (KR); Kalyan K. Kumar, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 849 days.

(21) Appl. No.: 11/966,181

(22) Filed: Dec. 28, 2007

(65) Prior Publication Data

US 2008/0166059 A1    Jul. 10, 2008

(30) Foreign Application Priority Data

Dec. 28, 2006 (KR) .................. 10-2006-0136801

(51) Int. Cl.
*G06K 9/36* (2006.01)
(52) U.S. Cl. .................................................. 382/236
(58) Field of Classification Search .......... 382/232–233, 382/236, 238; 348/400.1–407.1, 409.1–413.1, 348/416.1; 375/240.12–240.16, 240.2–240.21, 375/240.25–240.26
See application file for complete search history.

(56) References Cited

U.S. PATENT DOCUMENTS 7,251,279 B2 *  7/2007  Song ...................... 375/240.16
7,706,447 B2 *  4/2010  Karczewicz et al. ...... 375/240.2

FOREIGN PATENT DOCUMENTS

EP            0584840 A2     3/1994

OTHER PUBLICATIONS

Indian Office Action issued in corresponding Indian application No. 2572/MUM/2007 on Apr. 28, 2011.

* cited by examiner

*Primary Examiner* — Jose L Couso
(74) *Attorney, Agent, or Firm* — Sughrue Mion, PLLC

(57) ABSTRACT

A method and apparatus for encoding/decoding an image that divide an image sequence into sub-groups and determine encoding modes applied to bi-directional pictures included in each sub-group using correlations between the bi-directional pictures and reference pictures are provided. The image encoding method includes dividing a group of pictures (GOP) to be encoded according to consecutive B pictures into sub-groups; calculating the correlations between each B picture included in the sub-group and reference picture according to each encoding mode; and applying one of the encoding modes wherein the reference picture having the highest correlation with the B picture are used in each sub-group to encode the image, thereby improving encoding efficiency.

17 Claims, 7 Drawing Sheets

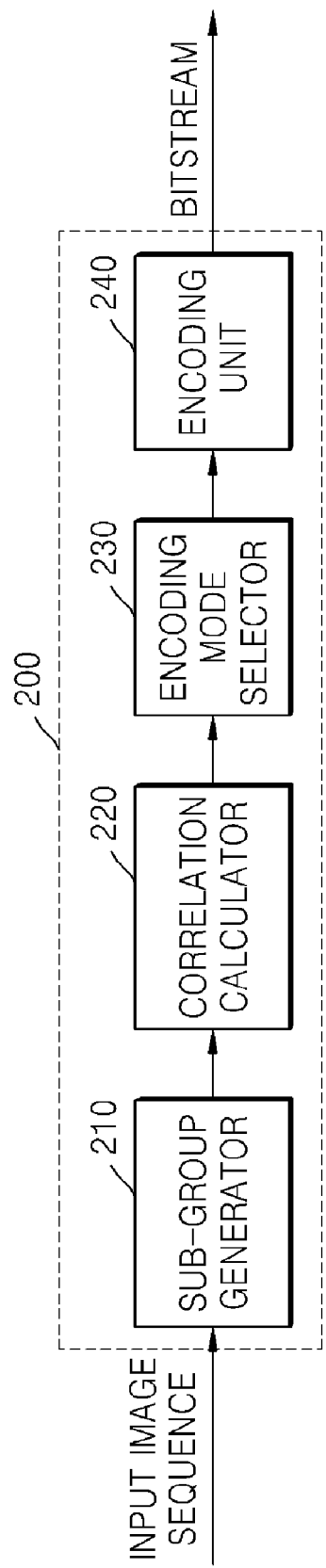

METHOD AND APPARATUS FOR ENCODING/DECODING AN IMAGE

CROSS-REFERENCE TO RELATED PATENT APPLICATION

This application claims priority from Korean Patent Application No. 10-2006-0136801, filed on Dec. 28, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to encoding/decoding an image, and more particularly, to encoding/decoding an image that divides an image sequence into sub-groups and determines encoding modes applied to bi-directional pictures included in each sub-group using correlations between the bi-directional pictures and reference pictures in order to improve encoding efficiency.

2. Description of the Related Art

When video is encoded, spatial redundancy and temporal redundancy of an image sequence are removed so as to compress the image sequence. To remove temporal redundancy, a reference picture that is a picture located to the front or rear of a currently encoded picture is used to search for an area of the reference picture similar to an area of the currently encoded picture. Then, an amount of motion between corresponding areas of the currently encoded picture and the reference picture are detected, and a residue between a prediction image obtained by the motion compensation based on the detected amount of motion and the currently encoded image is encoded.

Video standards such as Moving Picture Experts Group 1 (MPEG-1), MPEG-2, MPEG-4, H.264/Advanced Video Coding (AVC) and the like classify each picture of the image sequence into an I picture, a P picture, and a B picture according to a prediction encoding method. The I picture is encoded using information of the currently encoded picture itself without inter-prediction. The P picture is prediction-encoded referring to one previously processed picture located to the front or rear of the currently encoded picture. The B picture is prediction-encoded referring to two previously processed pictures located to the front or rear of the currently encoded picture.

FIGS. 1A through 1C illustrate a variety of encoding modes according to encoding of B pictures included in a group of pictures (GOP). Referring to FIG. 1A, video encoding that was suggested before the H.264/AVC standard was defined does not use the B pictures as reference pictures of other pictures, but uses I pictures or P pictures as reference pictures of another picture, which are called key pictures. In an encoding mode (hereinafter referred to as a "B picture non-reference mode") where the B pictures are not used as the reference pictures of other pictures, the B pictures are prediction-encoded by using the I pictures or the P pictures that are located to the front or rear of the B pictures in terms of time and are previously processed as the reference picture. For example, the B picture B1 is prediction encoded using the I picture I0 and the P picture P4, which are previously encoded and then restored during an encoding procedure.

Video standards such as H.264/AVC can use the B pictures as the reference picture of other pictures in order to improve encoding efficiency, since the reference picture can be controlled using a picture order count type parameter transmitted from a sequence parameter set (SPS). When the B pictures can be used as the reference pictures of other pictures, the encoding of the B pictures included in the GOP is divided into an encoding mode (hereinafter referred to as a "B picture reference mode") where all the B pictures can be used as the reference pictures of other pictures, and an encoding mode (hereinafter referred to as a "pyramid mode") where the B pictures having predetermined locations in the GOP are hierarchically prediction-encoded.

Referring to FIG. 1B, I pictures and P pictures and previously processed B pictures can also be used as reference pictures in the B picture reference mode. For example, a B picture B2 is prediction encoded using a P picture P4 and a B picture B1, which are first encoded and then restored. Although not shown, an I picture I0 and the B picture B1 that are previously encoded and then restored can be used as the reference pictures of the B picture B2.

Referring to FIG. 1C, B pictures are prediction-encoded by using key pictures (I pictures or P pictures) to the front or rear of consecutive B pictures and a B picture in the center of the consecutive B pictures as reference pictures in the pyramid mode. For example, an I picture I0 and a P picture P4 that are previously encoded and then restored are used as the reference pictures so as to prediction-encode a B picture B2 in the center of consecutive B pictures. The I picture I0 and the B picture B2 are used as the reference pictures so as to prediction-encode a B picture B1. The B picture B2 and the P picture P4 are used as the reference pictures to prediction-encode a B picture B3.

The performance of the various encoding modes is dependent on the characteristics of an image sequence to be encoded. An encoding sequence of B pictures and reference pictures thereof vary according to each of the encoding modes, which causes differences between prediction images according to each of the encoding modes and between prediction errors of B pictures. In the related art, an image is encoded by applying one of the encoding modes to pictures included in a GOP, thus failing to adaptively encode the image sequence according to the characteristics of an image.

SUMMARY OF THE INVENTION

The present invention provides a method and apparatus for encoding/decoding an image that adaptively apply an encoding/decoding mode to an image according to the characteristics of an image sequence in order to improve encoding/decoding efficiency.

The present invention provides a method and apparatus for encoding/decoding an image that divide a GOP into sub-groups and apply a different encoding/decoding mode to each sub-group according to the characteristics of the image in order to improve encoding/decoding efficiency.

According to an aspect of the present invention, there is provided an image encoding method comprising: dividing a GOP including a plurality of image pictures included in an image sequence into sub-groups according to consecutive bi-directional pictures; calculating correlations between the bi-directional pictures of each sub-group and reference pictures referred to by the bi-directional pictures based on a plurality of encoding modes classified according to whether the bi-directional pictures can be used as reference pictures of other pictures and the reference pictures referred to by the bi-directional pictures; selecting one of the plurality of encoding modes based on the correlations; and encoding the B pictures of each sub-group according to the selected encoding mode.

The plurality of encoding modes may include a bi-directional picture non-reference mode wherein the bi-directional pictures are not used as reference pictures, a bi-directional picture reference mode wherein all the bi-directional pictures can be used as reference pictures, and a pyramid mode wherein a bi-directional picture in the center of the consecutive bi-directional pictures of each sub-group is used as a reference picture of the other bi-directional pictures.

The calculating of the correlations may include calculating an average of differences between histograms of pixel values of each bi-directional picture included in the sub-group and histograms of pixel values of the reference picture according to the plurality of encoding modes, wherein the selecting of one of the plurality of encoding modes may include increasing a counting number of the encoding mode having the smallest average value from among the plurality of encoding modes; and selecting one of the plurality of encoding modes having the largest counting number.

The method may further include, that if the reference picture and the bi-directional picture have 0 through n−1 pixel values (n is an integral), the bi-directional picture is denoted by B, the reference picture is denoted by R, $H_B[i]$ denotes the number of pixels of the bi-directional picture B having a pixel value i (i is 0~n), and $H_R[i]$ denotes the number of pixels of the reference picture R having the pixel value i, the correlations H(B,R) between the reference picture R and the bi-directional picture B are calculated according to the following equation, $$H(B, R) = \left( \sum_{i=0}^{n-1} |H_B[i] - H_R[i]| \right) \Big/ n.$$

The calculating of the correlations may include calculating difference values between each bi-directional picture included in the sub-group and the reference picture according to the plurality of encoding modes are calculated using one of a Mean Square Error (MSE), a Sum of Absolute Differences (SAD), and a Sum of Squared Errors (SSE), wherein the selecting of one of the plurality of encoding modes may include increasing a counting number of the encoding modes having the smallest difference value from among the plurality of encoding modes; and selecting one of the plurality of encoding modes having the largest counting number.

According to another aspect of the present invention, there is provided an image encoding apparatus comprising: a sub-group generator that divides a GOP including a plurality of image pictures included in an image sequence into sub-groups according to consecutive bi-directional pictures; a correlation calculator that calculates correlations between the bi-directional pictures of each sub-group and reference pictures referred to by the bi-directional pictures based on a plurality of encoding modes classified according to whether the bi-directional pictures can be used as reference pictures of other pictures, and the reference pictures referred to by the bi-directional pictures; an encoding mode selector that selects one of the plurality of encoding modes based on the correlations; and an encoding unit that encodes the B pictures of each sub-group according to the selected encoding mode.

According to another aspect of the present invention, there is provided an image decoding method comprising: reading encoding mode information included in an input bitstream, dividing a plurality of encoded image pictures of the bitstream into sub-groups, and determining encoding modes used to encode bi-directional pictures of each sub-group; determining a decoding sequence of the bi-directional pictures of each sub-group and reference pictures according to the encoding modes; and decoding the bi-directional pictures of each sub-group using the decoding sequence and the reference pictures.

According to another aspect of the present invention, there is provided an image decoding apparatus comprising: an encoding mode discriminator that reads encoding mode information included in an input bitstream, divides a plurality of encoded image pictures of the bitstream into sub-groups, and determines encoding modes used to encode bi-directional pictures of each sub-group; a decoding sequence determiner that determines a decoding sequence of the bi-directional pictures of each sub-group and reference pictures according to the encoding modes; and a decoding unit that decodes the bi-directional pictures of each sub-group using the decoding sequence and the reference pictures.

BRIEF DESCRIPTION OF THE DRAWINGS

The above and other features of the present invention will become more apparent by describing in detail exemplary embodiments thereof with reference to the attached drawings in which:

FIG. 2 is a block diagram of an image encoding apparatus according to an exemplary embodiment of the present invention;

DETAILED DESCRIPTION OF EXEMPLARY EMBODIMENTS OF THE INVENTION

Figure 1A:
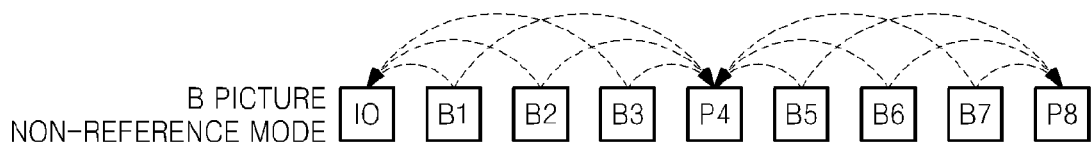
FIGS. 1A through 1C illustrate a variety of encoding modes according to encoding of B pictures included in a GOP.

Hereinafter, exemplary embodiments of the present invention will be described in detail with reference to the accompanying drawings.

A method and apparatus for encoding an image according to the present invention divide a GOP that includes a plurality of image pictures of an input image sequence into sub-groups, calculate correlation between object pictures of each sub-group that are to be encoded and reference pictures according to encoding modes, and determine an encoding mode based on the correlation, thereby adaptively encoding the image in the unit of a sub-group.

FIG. 2 is a block diagram of an image encoding apparatus 200 according to an exemplary embodiment of the present invention. Referring to FIG. 2, the image encoding apparatus 200 comprises a sub-group generator 210, a correlation calculator 220, an encoding mode selector 230, and an encoding unit 240.

The sub-group generator 210 divides an input image sequence every consecutive B pictures into sub-groups.

The correlation calculator 220 calculates a correlation between the B pictures of each sub-group and reference pictures referred to by the B pictures according to encoding modes.

The encoding mode selector 230 selects an encoding mode where a reference picture having the highest correlation with the B pictures of a sub-group that are being currently encoded is used, based on the correlation calculated by the correlation calculator 220.

The encoding unit 240 prediction-encodes each of the sub-groups according to the encoding mode selected by the encoding mode selector 230 in order to generate a bit stream.

The operation of the image encoding apparatus 200 of the present exemplary embodiment will now be described.

Figure 3:
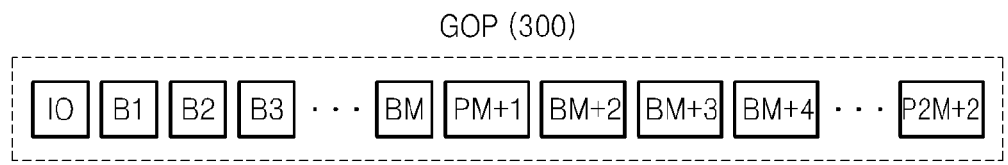
FIG. 3 illustrates an exemplary embodiment of a GOP that is input into the exemplary embodiment of the image encoding apparatus illustrated in FIG. 2.
Figure 4A:
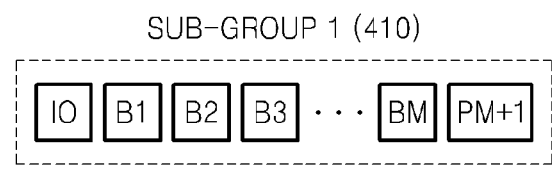
FIGS. 4A and 4B illustrate an exemplary embodiment of two sub-groups, into which the GOP illustrated in FIG. 3 is divided.
Figure 4B:
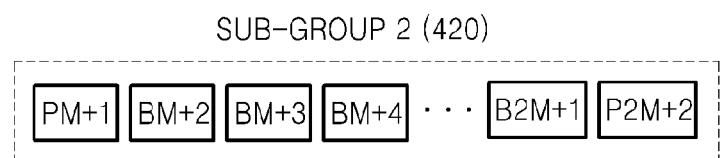

FIG. 3 illustrates a GOP 300 that is input into the image encoding apparatus 200 illustrated in FIG. 2. FIGS. 4A and 4B illustrate two sub-groups 410 and 420, into which the GOP illustrated in FIG. 3 is divided. Hereinafter, In, Pn, and Bn (n is an integral) are an $n^{th}$ I picture, an $n^{th}$ P picture, and an $n^{th}$ B picture, respectively, that are sequentially included in image pictures of the GOP 300.

Referring to FIG. 3, it is assumed that the GOP 300 includes M consecutive B pictures and key pictures (I pictures or P pictures) in the front or rear of the M consecutive B pictures. Although the GOP 300 includes two pairs of M consecutive B pictures B1 through BM and BM+2 through B2M+1 between the key pictures, I0, PM+1, and P2M+2 in the present exemplary embodiment, the present invention can be applied to encode the image pictures of the GOP 300 including more than two pairs of consecutive B pictures. Since a B picture in the center of the consecutive B pictures is used as a reference picture for the other B pictures in a pyramid mode, M, which is the number of the consecutive B pictures, may be an odd number. For example, but not by way of limitation, if M is 5, a B picture B3 in the center of five consecutive B pictures B1 through B5 is first prediction-encoded by using the I picture I0 and a P picture P6 as reference pictures The B pictures B1 and B2 before the B picture B3 are prediction-encoded by using the I picture I0 and the B picture B3 as reference pictures. The B pictures B4 and B5 after the B picture B3 are prediction-encoded by using the B picture B3 and the P picture P6 as reference pictures in the pyramid mode.

The sub-group generator 210 divides the GOP 300 into sub-groups so as to include the consecutive B pictures and the key pictures (I pictures or P pictures) on both ends of the consecutive B pictures.

Referring to FIGS. 4A and 4B, the GOP 300 is divided into the first sub-group 410, illustrated in FIG. 4A, that includes the M consecutive B pictures B1, B2, through to BM and the I picture I0 and the P picture PM+1 on both ends of the M consecutive B pictures, and the second sub-group 420, illustrated in FIG. 4B, that includes the M consecutive B pictures BM+2, BM+3, BM+4, through to B2M+1 and the P pictures PM+1 and P2M+2 on both ends of the M consecutive B pictures. The P picture PM+1 that is the key picture of the consecutive B pictures is included in both sub-groups 410 and 420 in order to calculate the correlation between the B pictures of each of the two sub-groups 410 and 420. The key pictures of each sub-group are not redundantly encoded when each sub-group is substantially encoded.

The correlation calculator 220 calculates a correlation between the B pictures of each of the two sub-groups 410 and 420 and reference pictures referred to by the B pictures according to each of encoding modes. The encoding modes, as mentioned in the related art, include a B picture non-reference mode where the B pictures are not used as reference pictures, a B picture reference mode where all the B pictures that are previously encoded and then restored can be used as reference pictures, and a pyramid mode where a bi-directional picture in the center of consecutive bi-directional pictures of a sub-group is used as a reference picture. It will be clearly understood by a person of ordinary skill in the art from the detailed description that the image encoding method according to the present invention can be applied to a different type of encoding mode other than these three encoding modes, where an encoding sequence of the B pictures and reference pictures that are used are transformed.

When the B pictures of the GOP 300 are bi-directional prediction-encoded in the B picture non-reference mode, the B picture reference mode, and the pyramid mode, Table 1 shows the reference pictures used to prediction-encode the B pictures of the GOP 300 according to each of the encoding modes.

TABLE 1

| B pictures to be encoded | Reference pictures used to prediction-encode B pictures according to each of the encoding modes | | |
|---|---|---|---|
| | B picture non-reference mode | B picture reference mode | Pyramid mode |
| B1 | I0, PM + 1 | I0, PM + 1 | I0, Bn |
| B2 | I0, PM + 1 | B1, PM + 1 | I0, Bn |
| B3 | I0, PM + 1 | B2, PM + 1 | I0, Bn |
| ... | ... | ... | ... |
| Bn − 1 | I0, PM + 1 | Bn − 2, PM + 1 | I0, Bn |
| Bn | I0, PM + 1 | Bn − 1, PM + 1 | I0, PM + 1 |
| Bn + 1 | I0, PM + 1 | Bn, PM + 1 | Bn, PM + 1 |
| ... | ... | ... | ... |
| BM | I0, PM + 1 | BM − 1, PM + 1 | Bn, PM + 1 |

In Table 1, n denotes an index indicating the B picture in the center of the M consecutive B pictures. n=(M+1)/2. If M is an even number, an n value can be rounded up or down to use the B picture in the center of the consecutive B pictures.

In the B picture non-reference mode, a B picture is not used as a reference picture of other pictures but instead an I picture or a P picture can be used as the reference picture. Therefore, the B picture is bi-directional prediction-encoded using the I picture or the P picture that is previously encoded and then restored in the B picture non-reference mode. For example, the I picture I0 and the P picture PM+1 that are previously encoded and then restored are used to prediction-encode the B picture B1.

Figure 1B:
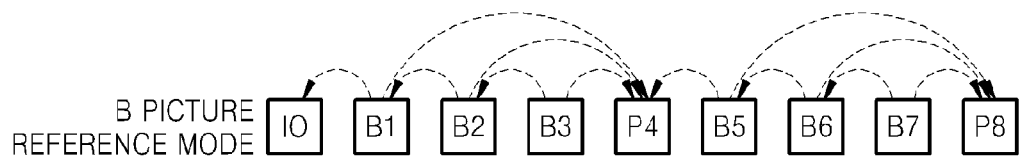
Figure 1C:
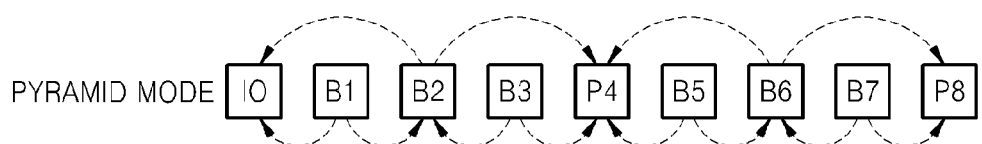

In the B picture reference mode, all the B pictures that are previously encoded and then restored can be used as reference pictures of other pictures. Therefore, all B pictures that are previously encoded and then restored before a B picture that is currently encoded are used as a reference picture as shown in Table 1. For example, referring to FIG. 1B and Table 1, the B picture B2 is prediction-encoded according to the B picture reference mode by using the B picture B1 and the P picture PM+1 that are completely processed before the B picture B2 as the reference pictures.

In the pyramid mode, a picture in the center of consecutive B pictures is used as a reference picture. For example, referring to FIG. 4A, when a B picture in the center of the consecutive B pictures B1 through BM is Bn, the B pictures B1 through Bn−1 are bi-directional prediction-encoded by using the I picture T0 and the B picture Bn as reference pictures, and the B pictures Bn+1 through BM are bi-directional prediction-encoded by using the B picture Bn and the P picture PM+1 as reference pictures.

The correlation calculator 220 calculates correlation between the B pictures of each sub-group and reference pictures used to prediction-encode the B pictures according to each of the three exemplary encoding modes. The correlation indicates the similarity between two images. The higher the correlation is, the more similar two images are.

Figure 5:
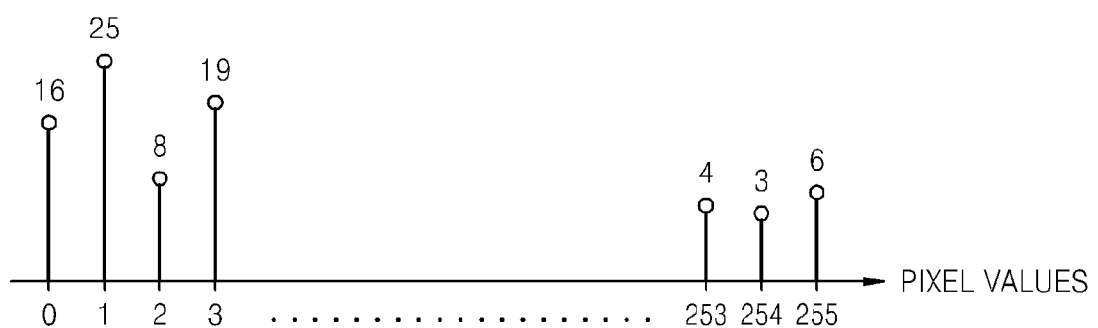
FIG. 5 is a histogram showing the distribution of values of pixels included in a picture, according to an exemplary embodiment of the present invention.

A variety of algorithms can be used to calculate the correlation between the B pictures of each sub-group and reference pictures. For example, but not by way of limitation, the correlation calculator 220 calculates the correlation by comparing histograms of a B picture that is currently encoded and histograms of a reference picture used to prediction-encode the B picture in each of the three exemplary encoding modes. The histogram is a summary graph showing the distribution of values of pixels included in a picture as illustrated in FIG. 5. Assuming that each 8-bit pixel has a value between 0 through 255, FIG. 5 illustrates an exemplary embodiment of a histogram of a picture having 16 pixels with a value 0, 25 pixels with a value 1 and so on.

Provided that two pictures X and Y have pixels having 0 through n−1 values, the correlation H(X,Y) between the two pictures X and Y is calculated according to the equation, $$H(X, Y) = \left( \sum_{i=0}^{n-1} |H_X[i] - H_Y[i]| \right) / n,$$

based on the histogram of the distribution of the pixel values, wherein $H_X[i]$ denotes the number of pixels having a value i of the picture X, and $H_Y[i]$ denotes the number of pixels having the value i of the picture Y. In detail, the correlation between the two pictures X and Y can be calculated by using an average of differences between histograms of the pixel values (the average of differences between the numbers of the same pixel values of the two pictures).

The correlation calculator 220 calculates the correlation between the B pictures of each sub-group and the reference pictures by calculating an average of differences between the histograms of pixel values of each B picture and the histograms of pixel values of each reference picture according to each of the three encoding modes.

For example, referring to FIG. 4A and Table 1, the correlation calculator 220 calculates the correlation H(B1, PM+1) between the P picture PM+1 that is used as a separate reference picture in each encoding mode and the B picture B1, and the correlation H(B1,Bn) between the B pictures Bn and B1, excluding the I picture I0 that is shared as the reference picture in all three encoding modes to determine an encoding mode where a reference picture having the highest correlation with the B picture B1 of the first sub-group 410 is used.

If no common picture is used as the reference picture of a current B picture in a plurality of encoding modes, the correlation calculator 220 calculates correlations between each reference picture used in each encoding mode and the current B picture, and uses an average of the correlations as the correlation between the current B picture and the reference pictures. For example, referring to Table 1, a common picture used to prediction-encode the B picture B2 of the first sub-group 410 does not exist in the B picture non-reference mode, the B picture reference mode, or the pyramid mode. In this case, the correlation calculator 220 uses (H(B2, I0)+H(B2, PM+1))/2 as a value indicating the correlation between the B picture B2 and the I picture I0 and the P picture PM+1 that are the reference pictures in the B picture non-reference mode, (H(B2, B1)+H(B2, PM+1))/2 as a value indicating the correlation between the B picture B2 and the I picture I0 and the P picture PM+1 that are the reference pictures in the B picture reference mode, and (H(B2, I0)+H(B2, Bn))/2 as a value indicating the correlation between the B picture B2 and the I picture I0 and the B picture Bn that are the reference pictures in the pyramid mode.

The encoding mode selector 230 counts the number of the encoding modes of each of the B pictures where reference pictures having the highest correlation with the B pictures that are currently encoded are used, based on the correlations calculated by the correlation calculator 220, and selects an encoding mode to be applied to each sub-group from the encoding modes. For example, referring to FIG. 4A, if M is 5, the counting number of the B picture reference modes is b, the counting number of the B picture non-reference modes is nr, and the counting number of the pyramid modes is p(here, b+nr+p=5), then the correlation calculator 220 calculates the correlation between each of the B pictures B1 through B5 of the first sub-group 410 and the reference pictures according to each encoding mode. The encoding mode selector 230 increases the counting number of the encoding modes when the reference pictures having the largest correlation with the B pictures that are currently encoded are used. If it is determined that b=1, nr=1, and p=3, the encoding mode selector 230 selects the pyramid mode as an encoding mode of the B pictures B1 through B5 of the first sub-group 410.

The correlation calculator 220 compares the correlations between the B pictures of each sub-group and the reference pictures according to each encoding mode by comparing the correlations between the B pictures of each sub-group and the reference pictures according to two encoding modes selected from a plurality of encoding modes and comparing the correlations between the B pictures of each sub-group and the reference pictures according to other combinations of two encoding modes. In detail, the correlation calculator 220 calculates the correlations between the reference pictures according to the B picture reference mode and the B picture non-reference mode and the B pictures of each sub-group, and counts the number of encoding modes having a higher correlation, calculates the correlations between the reference pictures according to the B picture non-reference mode and the pyramid mode and the B pictures of each sub-group and counts the number of encoding modes having a higher correlation, and calculates the correlations between the reference pictures according to the B picture reference mode and the pyramid mode and the B pictures of each sub-group and counts encoding modes having a higher correlation, and finally determines one of the three encoding modes having the largest counting number as an encoding mode of each sub-group.

In more detail, the correlation calculator 220 calculates the correlations between the reference pictures according to the B picture reference mode and the B picture non-reference mode and the B pictures of the first sub-group 410. Table 2 shows the correlations to be compared according to the B pictures of the first sub-group 410.

TABLE 2

| B pictures to be encoded | Correlations to be compared according to B pictures | |
|---|---|---|
| | B picture non-reference mode | B picture reference mode |
| B1 | No Comparison | |
| B2 | H (B2, IO) | H (B2, B1) |
| B3 | H (B3, IO) | H (B3, B2) |
| ... | ... | ... |
| Bn − 1 | H (Bn − 1, IO) | H (Bn − 1, Bn − 2) |
| Bn | H (Bn, IO) | H (Bn, Bn − 1) |
| Bn + 1 | H (Bn + 1, IO) | H (Bn + 1, Bn) |
| ... | ... | ... |
| BM | H (BM, IO) | H (BM, BM − 1) |

Referring to Tables 1 and 2, since the first B picture B1 of the first sub-group 410 is prediction-encoded by using the I picture IO and the P picture PM+1 as the reference pictures in the B picture reference mode and the B picture non-reference mode, the correlation calculator 220 does not need to calculate the correlations between the first B picture B1 and the reference pictures according to the B picture reference mode and the B picture non-reference mode. The correlation calculator 220 calculates the correlations between the B pictures of the first sub-group 410 and the reference pictures according to the B picture reference mode and the B picture non-reference mode, and increases the number of the two encoding modes where the reference pictures having a higher correlation with the B pictures are used, excluding the same reference pictures used in the B picture reference mode and the B picture non-reference mode. For example, when the B picture B3 is prediction-encoded, since the I picture IO and the P picture PM+1 are used as the reference pictures in the B picture non-reference mode, and the B picture B2 and the P picture PM+1 are used as the reference pictures in the B picture reference mode, the correlation calculator 220 calculates the correlation H(B3,IO) between the B picture B3 and the reference picture IO and the correlation H(B3,B2) between the B picture B3 and the reference picture B2, and increases the counting number of the one of the two encoding modes having a higher correlation, excluding the common reference picture PM+1 used in the two encoding modes. Since the lower the H(X,Y) value is, the more similar the distribution of values of pixels of two image pictures X and Y is, then the higher the correlation between the two image pictures X and Y is. Therefore, if H(B3,IO)>H(B3,B2), since the B picture B3 that is currently encoded and the reference picture B2 have the higher correlation, the correlation calculator 220 increases the counting number r of the B picture reference mode suitable for encoding the B picture B3 where the B picture B2 is used as the reference picture. If H(B3,IO)<H(B3,B2), the correlation calculator 220 increases the counting number nr of the B picture non-reference mode. These operations are repeatedly performed with regard to all the B pictures of the first sub-group 410.

Next, the correlation calculator 220 calculates the correlations between the reference pictures according to the B picture non-reference mode and the pyramid mode and the B pictures of the first sub-group 410. Table 3 shows the correlations to be compared according to the B pictures of the first sub-group 410.

TABLE 3

| B pictures to be encoded | Correlations to be compared according to B pictures | |
|---|---|---|
| | B picture non-reference mode | Pyramid mode |
| B1 | H (B1, PM + 1) | H (B1, Bn) |
| B2 | H (B2, PM + 1) | H (B2, Bn) |
| B3 | H (B3, PM + 1) | H (B3, Bn) |
| ... | ... | ... |
| Bn − 1 | H (Bn − 1, PM + 1) | H (Bn − 1, Bn) |
| Bn | No comparison | |
| Bn + 1 | H (Bn + 1, IO) | H (Bn + 1, Bn) |
| ... | ... | ... |
| BM | H (BM, IO) | H (BM, Bn) |

Referring to Tables 1 and 3, since the B picture Bn in the center of the M consecutive B pictures of the first sub-group 410 is prediction-encoded by using the I picture IO and the P picture PM+1 as the reference pictures in the B picture non-reference mode and the pyramid mode, the correlation calculator 220 does not need to calculate the correlations between the B picture Bn and the reference pictures according to the B picture non-reference mode and the pyramid mode. The correlation calculator 220 calculates the correlations between the B pictures of the first sub-group 410 and the reference pictures according to the B picture non-reference mode and the pyramid mode and increases the counting number of one of the two encoding modes when the reference pictures having a higher correlation with the B pictures are used, excluding the same reference pictures used in the B picture non-reference mode and the pyramid mode. For example, when the B picture B2 is prediction-encoded, since the I picture IO and the P picture PM+1 are used as the reference pictures in the B picture non-reference mode, and the I picture IO and the B picture Bn are used as the reference pictures in the pyramid mode, the correlation calculator 220 calculates the correlation H(B2,PM+1) between the B picture B2 and the reference picture PM+1 and the correlation H(B2,Bn) between the B pictures B2 and the reference picture Bn, and increases the counting number of the one of the two encoding modes having a higher correlation, excluding the common reference picture IO used in the two encoding modes. If H(B2,PM+1)<H(B2,Bn), since the B picture B2 that is currently encoded and the reference picture Bn have the higher correlation, the correlation calculator 220 increases the counting number p of the pyramid mode suitable for encoding the B picture B2 where the B picture Bn is used as the reference picture. If H(B2,PM+1)<H(B2,Bn), the correlation calculator 220 increases the number nr of the B picture non-reference mode. These operations are repeatedly performed with regard to all the B pictures of the first sub-group 410.

The correlation calculator 220 calculates the correlations between the reference pictures according to the B picture reference mode and the pyramid mode and the B pictures of the first sub-group 410. Table 4 shows the correlations to be compared according to the B pictures of the first sub-group 410.

TABLE 4

| B pictures to be encoded | Correlations to be compared according to B pictures | |
|---|---|---|
| | B picture reference mode | Pyramid mode |
| B1 | H (B1, PM + 1) | H (B1, Bn) |
| B2 | H (B2, B1), H (B2, PM + 1) | H (B2, IO), H (B2, Bn) |
| B3 | H (B3, B2), H (B3, PM + 1) | H (B2, IO), H (B3, Bn) |
| ... | ... | ... |

TABLE 4-continued

| B pictures to be encoded | Correlations to be compared according to B pictures | |
|---|---|---|
| | B picture reference mode | Pyramid mode |
| Bn − 1 | H (Bn − 1, Bn − 2), H (Bn − 1, PM + 1) | H (B2, I0), H (Bn − 1, Bn) |
| Bn | H (Bn, Bn − 1) | H (Bn, I0) |
| Bn + 1 | No Comparison | |
| ... | ... | ... |
| BM | H (BM, BM − 1) | H (BM, Bn) |

Referring to Tables 1 and 4, since the B picture Bn+1 of the first sub-group 410 is prediction-encoded by using the B picture Bn and the P picture PM+1 as the reference pictures in the B picture reference mode and the pyramid mode, the correlation calculator 220 does not need to calculate the correlations between the B picture Bn and the reference pictures according to the B picture reference mode and the pyramid mode. The correlation calculator 220 calculates the correlations between the B pictures of the first sub-group 410 and the reference pictures according to the B picture reference mode and the pyramid mode and increases the counting number of one of the two encoding modes when the reference pictures having a higher correlation with the B pictures are used, excluding the same reference pictures used in the B picture reference mode and the pyramid mode. For example, when the B picture B1 is prediction-encoded, since the I picture I0 and the P picture PM+1 are used as the reference pictures in the B picture reference mode, and the I picture I0 and the B picture Bn are used as the reference pictures in the pyramid mode, the correlation calculator 220 calculates the correlation H(B1,PM+1) between the B picture B1 and the reference picture PM+1 and the correlation H(B1,Bn) between the B picture B1 and the reference picture Bn, and increases the counting number of the one of the two encoding modes having a higher correlation, excluding the common reference picture I0 used in the two encoding modes. If H(B1,PM+1) >H(B1,Bn), since the B picture B1 that is currently encoded and the B picture Bn have the higher correlation, the correlation calculator 220 increases the number p of the pyramid mode suitable for encoding the B picture B1 when the B picture Bn is used as the reference picture. If H(B1,PM+1) <H(B1,Bn), the correlation calculator 220 increases the counting number r of the B picture reference mode. When the B picture B2 is prediction-encoded, the B picture B1 and the reference picture PM+1 are used as the reference pictures in the B picture reference mode, and the I picture I0 and the B picture Bn are used as the reference pictures in the pyramid mode.

When each encoding mode uses a different reference picture, all the correlations between the reference pictures according to each encoding mode and the B pictures that are currently encoded need to be considered. If {H(B2, B1)+H (B2, PM+1)}>{H(B2, I0)+H(B2, Bn)} as a result of calculating the correlations H(B2, B1) and H(B2, PM+1) between the B picture B2 and the reference pictures B1 and PM+1 used in the B picture reference mode, calculating the correlations H(B2, I0) and H(B2, Bn) between the B picture B2 and the reference pictures I0 and Bn used in the pyramid mode, and comparing {H(B2, B1)+H(B2, PM+1)} and {H(B2, I0)+H (B2, Bn)}, since the B picture B2 that is currently encoded has a higher correlation with the reference pictures I0 and PM+1, the correlation calculator 220 increases the counting number p of the pyramid mode suitable for encoding the B picture B2 where the I picture I0 and the P picture PM+1 are used as the reference pictures. If {H(B2, B1)+H(B2, PM+1)}<{H(B2, I0)+H(B2, Bn)}, the correlation calculator 220 increases the counting number r of the B picture reference mode.

The correlation calculator 220 repeatedly compares the correlations between the B pictures of each sub-group and the reference pictures according to each combination of two encoding modes. The encoding mode selector 230 selects an encoding mode having the largest counting number.

An algorithm used to compare the correlations between the B pictures of each sub-group and the reference pictures according to each encoding mode and select an encoding mode to be applied to each sub-group is summarized as follows.

Step 1: It is established that nr is a counting number indicating that the B picture non-reference mode is determined to have a higher correlation with a B picture that is to be encoded, p is a counting number indicating that the pyramid mode is determined to have a higher correlation with the B picture, and r is a counting number indicating that the B picture reference mode is determined to have a higher correlation with the B picture, and then nr, p, and r are set to 0 at the beginning of processing the first sub-group 410.

Step 2: The correlations between the B pictures of the first sub-group 410 and the reference pictures used in the B picture non-reference mode and the B picture reference mode are calculated based on Table 2, and the counting number of encoding modes having a higher correlation is increased.

```
{ for i=2 to M
    if H(Bi,I0)<H(Bi, Bi−1) then nr+=1;
    else r+=1;
}
```

Step 3: The correlations between the B pictures of the first sub-group 410 and the reference pictures used in the B picture non-reference mode and the pyramid mode are calculated based on Table 3, and the counting number of encoding modes having a higher correlation is increased.

```
{ for i=1 to n−1
    if H(Bi,PM+1)<H(Bi, Bn) then nr+=1;
    else p+=1;
and for i=n+1 to M
    if H(Bi,I0)<H(Bi, Bn) then nr+=1;
    else p+=1;
}
```

Step 4: The correlations between the B pictures of the first sub-group 410 and the reference pictures used in the B picture reference mode and the pyramid mode are calculated based on Table 4, and the counting number of encoding modes having a higher correlation is increased.

```
{ for i=1
    if H(Bi,PM+1)<H(Bi, Bn) then r+=1;
    else p+=1;
for i=2 to n−1
    if (H(Bi,Bi−1)+H(Bi,PM+1) < (H(Bi,I0)+H(Bi, Bn)) then r+=1;
    else p+=1;
for i=n
    if H(Bi, Bi−1)<H(Bi,I0) then r+=1;
    else p+=1;
```

```
and for i=n+2 to M
    if H(Bi,Bi−1)<H(Bi,Bn) then r+=1;
    else p+=1;
}
```

Step 5: The counting numbers of encoding modes are compared to finally determine one of the encoding modes having the largest counting number as an encoding mode to be applied to the first sub-group 410.

Step 6: The steps 1 through 5 repeat with regard to the second sub-group 420. A person of ordinary skill in the art can easily modify the exemplary embodiment of the program code parameters mentioned in the steps 1 through 5 and thus their detailed description is omitted.

The correlation calculator 220 may use the input original image based on an error in the calculation complexity and quantization noise to calculate the correlations between the B pictures and the reference pictures. The correlation calculator 220 can use an error calculation algorithm such as an MSE, an SAD, and an SSE, instead of the histograms of the distribution of pixel values of two comparable pictures in order to calculate the correlations. The correlation calculator 220 calculates errors between each B picture included in each sub-group and the reference picture used in each encoding mode using one of the MSE, SAD, and SSE error calculation algorithms. The encoding mode selector 230 counts the encoding modes when the reference picture having the minimum errors with the B pictures are used, and determines the one of the encoding modes having the largest counting number as an encoding mode to be applied to each sub-group.

Figure 6:
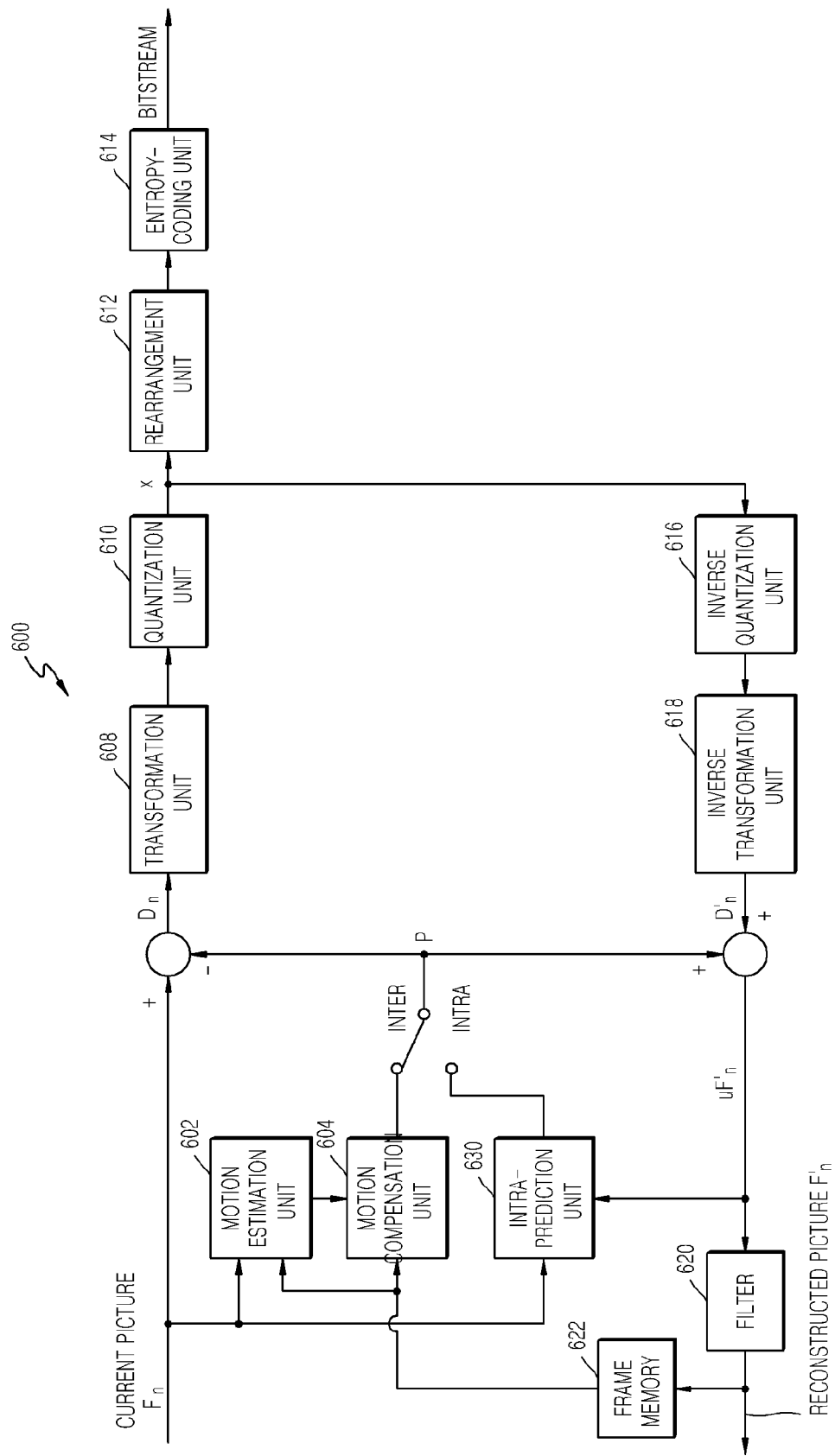
FIG. 6 is a block diagram of an exemplary embodiment of the encoding unit illustrated in FIG. 2.

FIG. 6 is a block diagram of the encoding unit illustrated in FIG. 2. Referring to FIG. 6, the encoding unit 600 encodes the image pictures of each sub-group according to the encoding modes determined by the encoding mode selector 230 and can be substituted with an image encoding apparatus. The encoding unit 600 includes a motion estimation unit 602, a motion compensation unit 604, an intra-prediction unit 630, a transformation unit 608, a quantization unit 610, a rearrangement unit 612, an entropy-coding unit 614, an inverse quantization unit 616, an inverse transformation unit 618, a filter 620, and a frame memory 622.

The motion estimation unit 602 performs motion estimation in which a prediction value of a B or P picture that is currently encoded is searched for in a reference picture in order to prediction-encode a B or P picture included in a sub-group. The motion compensation unit 604 acquires a prediction image as a result of the motion estimation from the reference picture, and forms the prediction image of the B or P picture that is currently encoded.

The intra-prediction unit 630 performs intra-prediction in which the prediction value of the I picture is searched for in the current I picture.

If the prediction pictures of the current pictures are generated by inter-prediction or intra-prediction, residues that are differences between the prediction pictures and the current pictures are calculated, transformed by the transformation unit 608, and quantized by the quantization unit 610. The quantized residues are rearranged by the rearrangement unit 612 in a predetermined sequence and then entropy-encoded by the entropy-coding unit 614 so as to be output in the form of a bitstream.

The transformed and quantized pictures are inversely quantized by the inverse quantization unit 616 and are inversely transformed by the inverse transformation unit 618, thereby reconstructing the pictures in order to obtain a reference picture used to predict the B or P picture. The reconstructed pictures pass through the filter 620 that performs deblocking filtering and are stored in the frame memory 622 so as to be used for inter-prediction of a next picture.

Figure 7:
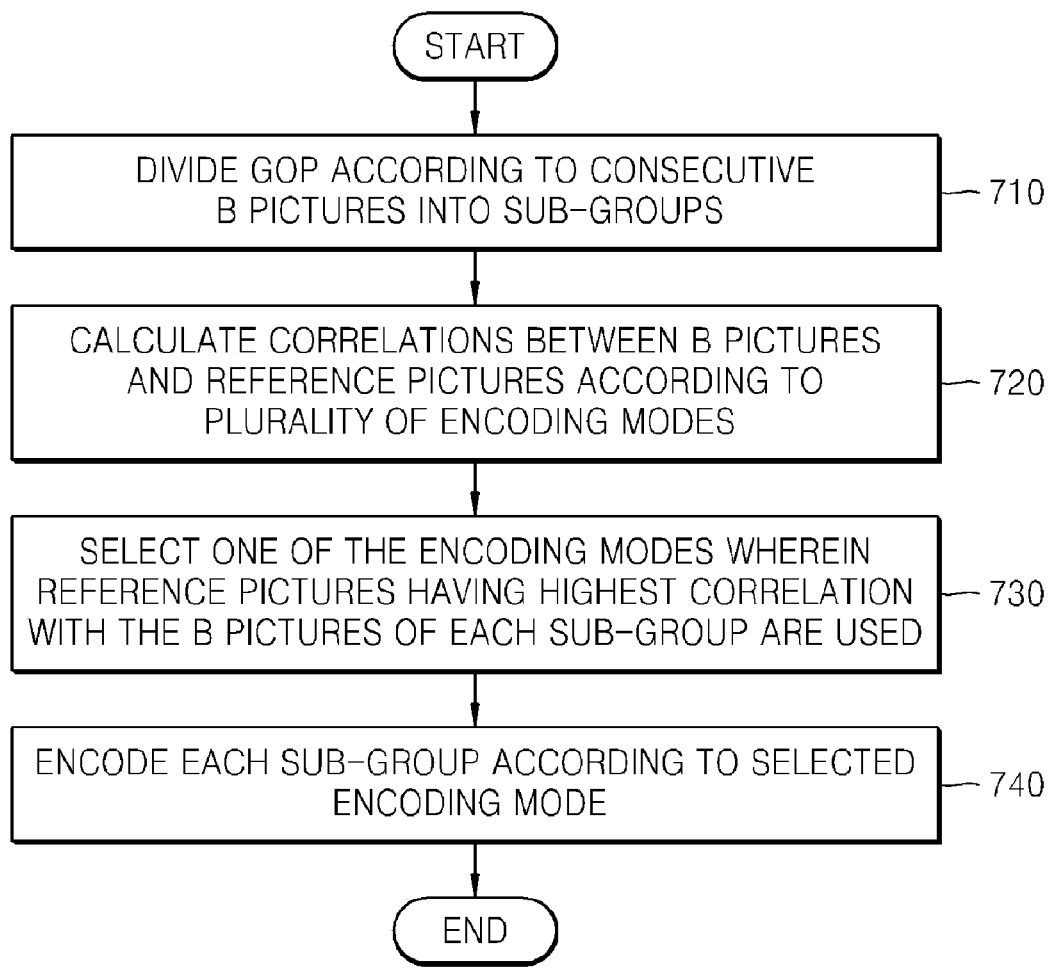
FIG. 7 is a flowchart illustrating an image encoding method according to an exemplary embodiment of the present invention.

FIG. 7 is a flowchart illustrating an image encoding method according to an exemplary embodiment of the present invention. Referring to FIG. 7, a GOP including a plurality of image pictures included in an image sequence is divided according to consecutive B pictures into sub-groups (Operation 710).

The correlations between B pictures of each sub-group and reference pictures referred to by the B pictures according to an applicable plurality of encoding modes are calculated (Operation 720).

One of the encoding modes is selected based on the correlations between the B pictures and the reference pictures according to each encoding mode (Operation 730). The correlations between the B pictures and the reference pictures according to each encoding mode are calculated in order to count the encoding modes where the reference pictures having a higher correlation with the B pictures are used, and to determine one of the encoding modes having the largest counting number as an encoding mode to be applied to each sub-group.

Each sub-group is prediction-encoded according to the selected encoding mode (Operation 740).

Figure 8:
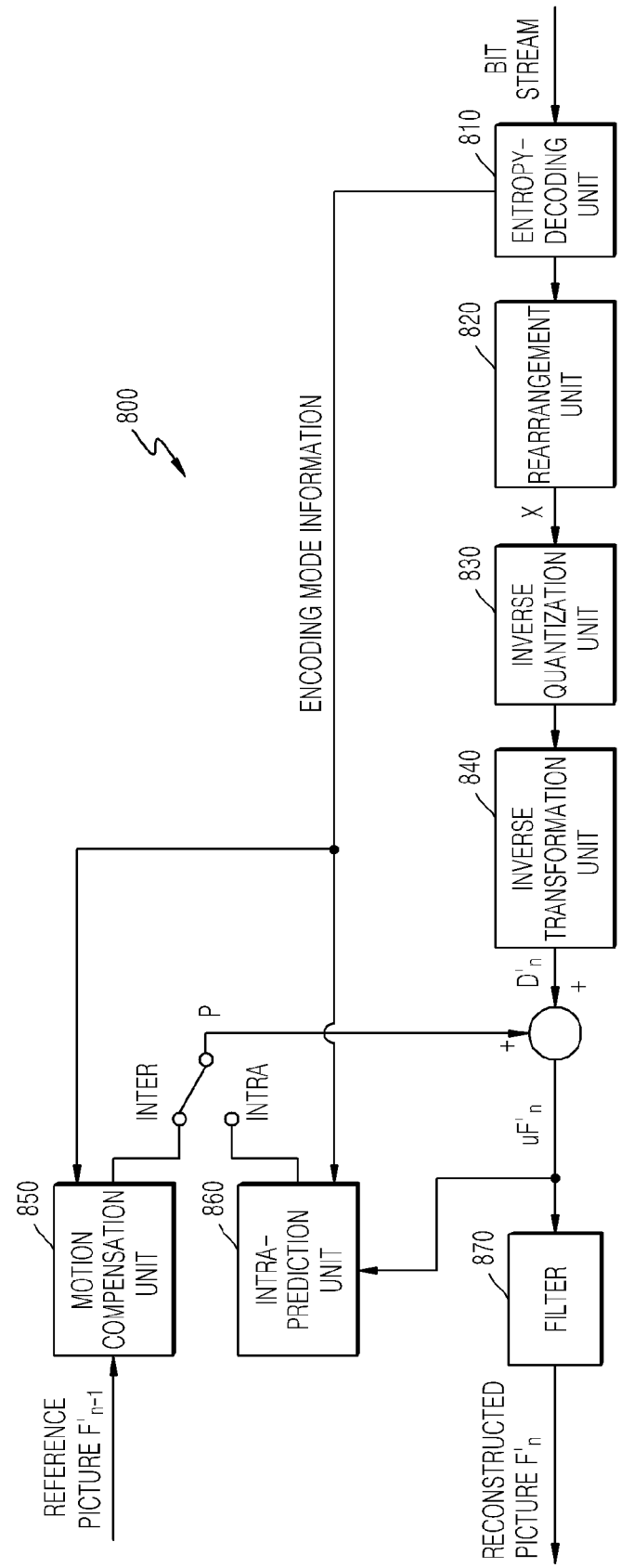
FIG. 8 is a block diagram of an image decoding apparatus according to an exemplary embodiment of the present invention.

FIG. 8 is a block diagram of an image decoding apparatus 800 according to an exemplary embodiment of the present invention. Referring to FIG. 8, the image decoding apparatus 800 includes an entropy-decoding unit 810, a rearrangement unit 820, an inverse quantization unit 830, an inverse transformation unit 840, a motion compensation unit 850, an intra-prediction unit 860, and a filter 870.

The entropy-decoding unit 810 and the rearrangement unit 820 receive a compressed bitstream and perform entropy-decoding, thereby generating a quantized coefficient X. The inverse quantization unit 830 and the inverse transformation unit 840 perform inverse quantization and inverse transformation on the quantized coefficient X in order to extract transformation encoding coefficients, motion vector information, etc. The motion compensation unit 850 and the intra-prediction unit 860 generate a prediction block according to an encoded picture type based on the decoded header information. The prediction block is added to an error value $D'_n$ to generate $uF'_n$. $uF'_n$ passes through the filter 870 and is reconstructed in the picture $F'_n$.

In particular, the image decoding apparatus 800 of the present exemplary embodiment reads encoding mode information included in an input bitstream, divides a plurality of encoded image pictures of the bitstream into sub-groups, determines encoding modes used to encode bi-directional pictures of each sub-group, and determines a decoding sequence of the bi-directional pictures and reference pictures according to the encoding modes to perform decoding of the image pictures.

Figure 9:
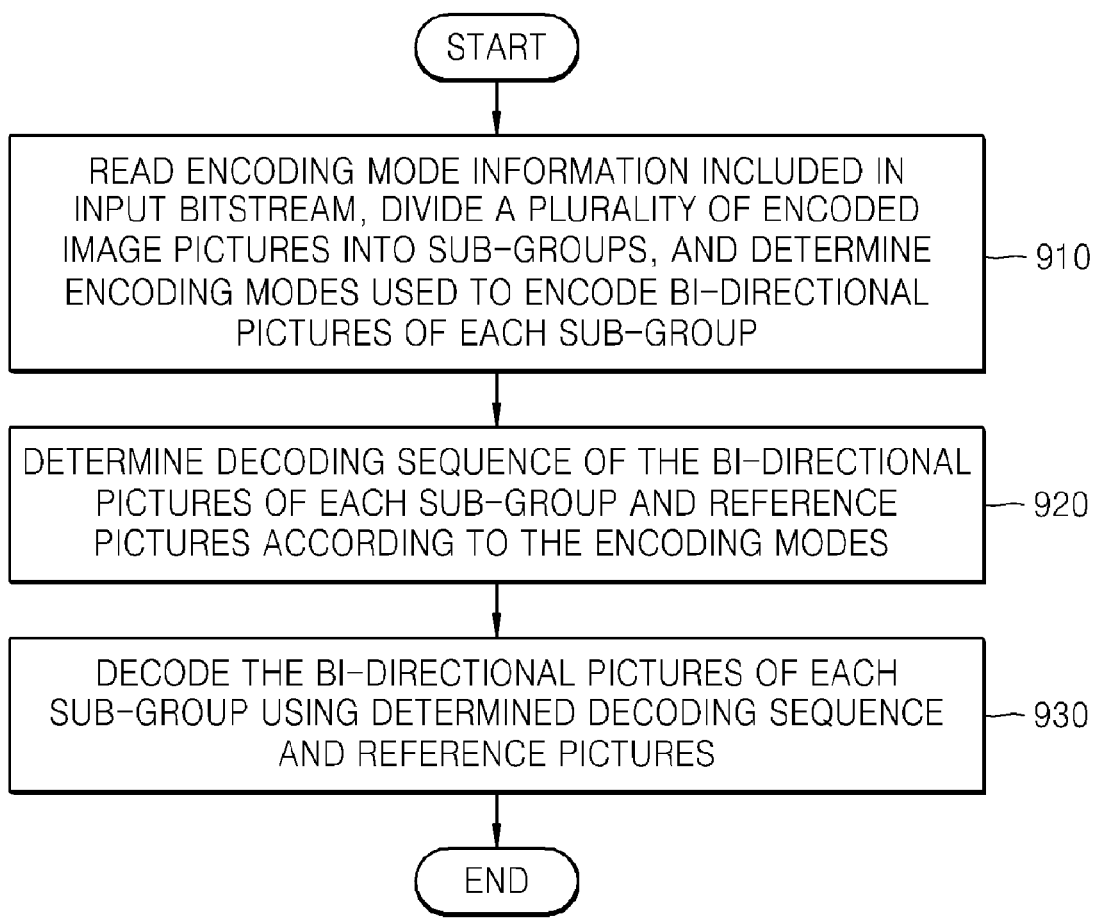
FIG. 9 is a flowchart illustrating an image decoding method according to an exemplary embodiment of the present invention.

FIG. 9 is a flowchart illustrating an image decoding method according to an exemplary embodiment of the present invention. Referring to FIG. 9, encoding mode information included in an input bitstream is read, a plurality of encoded image pictures of the bitstream is divided into sub-groups, and encoding modes used to encode bi-directional pictures of each sub-group are determined (Operation 910).

A decoding sequence of the bi-directional pictures and reference pictures according to the encoding modes are determined (Operation 920).

The bi-directional pictures of each sub-group are decoded using the decoding sequence and the reference pictures in order to reconstruct the image (Operation 930).

The present invention can also be embodied as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion.

As described in the exemplary embodiments above, according to the present invention, an encoding mode, whereby reference pictures similar to pictures to be prediction-encoded are used, is determined in each sub-group, thereby reducing a prediction error between a prediction image and an image to be encoded according to the characteristics of the image and thus improving encoding efficiency.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image encoding method comprising:
using a processor which performs the method comprising the steps of:
dividing a group of pictures (GOP) including a plurality of image pictures included in an image sequence into sub-groups according to consecutive bi-directional pictures;
calculating correlations between first bi-directional pictures of a first sub-group and reference pictures referred to by the first bi-directional pictures for each of a plurality of encoding modes including a bi-directional picture non-reference mode wherein the first bi-directional pictures are not used as reference pictures, and a bi-directional picture reference mode wherein at least one of the first bi-directional pictures is used as reference picture;
selecting one of the plurality of encoding modes based on the correlations; and
encoding B pictures of the first sub-group according to the selected encoding mode.

2. The method of claim 1, wherein the plurality of encoding modes further include a pyramid mode wherein a bi-directional picture in a center of the first bi-directional pictures of the first sub-group is used as a reference picture of other of the first bi-directional pictures.

3. The method of claim 1, wherein the calculating of the correlations comprises:
calculating an average of differences between histograms of pixel values of each of the first bi-directional pictures included in the first sub-group and histograms of pixel values of the reference pictures according to the plurality of encoding modes,
wherein the selecting of one of the plurality of encoding modes comprises:
increasing a counting number of the encoding mode having the smallest average value from among the plurality of encoding modes; and
selecting one of the plurality of encoding modes having the largest counting number.

4. The method of claim 3, wherein if the reference pictures and the first bi-directional pictures have 0 through n−1 pixel values, where n is an integral, one of the bi-directional pictures is denoted by B, one of the reference pictures is denoted by R, $H_B[i]$ denotes a number of pixels of the bi-directional picture B having a pixel value i that varies from zero to n, and $H_R[i]$ denotes a number of pixels of the reference picture R having the pixel value i, the correlations H(B,R) between the reference pictures and the first bi-directional pictures are calculated according to the following equation, $$H(B, R) = \left(\sum_{i=0}^{n-1} |H_B[i] - H_R[i]|\right) / n.$$

5. The method of claim 1, wherein the calculating of the correlations further comprises:
calculating difference values between each of the first bi-directional pictures included in the sub-group and the reference picture according to the plurality of encoding modes using one of a Mean Square Error, a Sum of Absolute Differences, and a Sum of Squared Errors,
wherein the selecting of one of the plurality of encoding modes comprises:
increasing a counting number of the plurality of encoding modes having a smallest difference value from among the plurality of encoding modes; and
selecting one of the plurality of encoding modes having a largest counting number.

6. An image encoding apparatus comprising:
a sub-group generator processor that divides a group of pictures (GOP) including a plurality of image pictures included in an image sequence into sub-groups according to consecutive bi-directional pictures;
a correlation calculator that calculates correlations between first bi-directional pictures of a first sub-group and reference pictures referred to by the first bi-directional pictures for each of a plurality of encoding modes including a bi-directional picture non-reference mode wherein the first bi-directional pictures are not used as reference pictures, and a bi-directional picture reference mode wherein at least one of the first bi-directional pictures is used as a reference picture;
an encoding mode selector that selects one of the plurality of encoding modes based on the correlations; and
an encoding unit that encodes B pictures of each sub-group according to the selected encoding mode.

7. The apparatus of claim 6, wherein the plurality of encoding modes further includes a pyramid mode wherein a bi-directional picture in a center of the first bi-directional pictures of the first sub-group is used as a reference picture of other of the first bi-directional pictures.

8. The apparatus of claim 6, wherein the correlation calculator calculates an average of differences between histograms of pixel values of each of the first bi-directional picture included in the first sub-group and histograms of pixel values of the reference pictures according to the plurality of encoding modes.

9. The apparatus of claim 6, wherein the encoding mode selector increases a counting number of the encoding mode wherein the reference pictures having a highest correlation with the first bi-directional pictures that are currently encoded are used, and selects one of the plurality of encoding modes having a largest counting number after processing the first bi-directional pictures of the first sub-group.

10. The apparatus of claim 6, wherein if the reference pictures and the bi-directional pictures have 0 through n−1 pixel values, where n is an integral, one of the bi-directional pictures is denoted by B, the reference picture is denoted by R, $H_B[i]$ denotes a number of pixels of the bi-directional picture B having a pixel value i that varies from zero to n, and $H_R[i]$ denotes a number of pixels of the reference picture R having the pixel value i, the correlation calculator calculates the correlations H(B,R) between the reference pictures and the first bi-directional pictures according to the following equation, $$H(B, R) = \left(\sum_{i=0}^{n-1} |H_B[i] - H_R[i]|\right) / n.$$

11. The apparatus of claim 6, wherein the correlation calculates difference values between each of the first bi-directional pictures included in the sub-group and the reference pictures according to the plurality of encoding modes using one of a Mean Square Error, a Sum of Absolute Differences, and a sum of Squared Errors, wherein the encoding mode selector increases a counting number of the plurality of encoding modes having a smallest difference value from among the plurality of encoding modes, and selects one of the plurality of encoding modes having a largest counting number.

12. An image decoding method comprising:
using a processor which performs the method comprising the steps of:
reading encoding mode information included in an input bitstream;
dividing a plurality of encoded image pictures of the bitstream into sub-groups, and determining encoding modes used to encode first bi-directional pictures of a first sub-group based on the encoding mode information which indicates an encoding mode used to encode the first bi-directional pictures of the first sub-group among a plurality of encoding modes which include at least a bi-directional picture non-reference mode wherein the first bi-directional pictures are not used as reference pictures and a bi-directional picture reference mode wherein at least one of the first bi-directional pictures is used as reference picture;
determining a decoding sequence of the first bi-directional pictures of the first sub-group and reference pictures according to the encoding modes; and
decoding the first bi-directional pictures of the first sub-group using the decoding sequence and the reference pictures.

13. The method of claim 12, wherein the plurality of encoding modes further include a pyramid mode wherein a bi-directional picture in a center of the first bi-directional pictures of the first sub-group is used as a reference picture of other of the first bi-directional pictures.

14. An image decoding apparatus comprising:
an encoding mode processor that reads encoding mode information included in an input bitstream, divides a plurality of encoded image pictures of the input bitstream into sub-groups, and determines encoding modes used to encode bi-directional pictures of the sub-groups based on the encoding mode information which indicates an encoding mode used to encode the first bi-directional pictures of the first sub-group among a plurality of encoding modes which include at least a bi-directional picture non-reference mode wherein the first bi-directional pictures are not used as reference pictures and a bi-directional picture reference mode wherein at least one of the first bi-directional pictures is used as reference picture;
a decoding sequence determiner that determines decoding sequences of the bi-directional pictures of the sub-groups and reference pictures according to the encoding modes; and
a decoding unit that decodes the bi-directional pictures of the sub-groups using the decoding sequences and the reference pictures.

15. The apparatus of claim 14, wherein the plurality of encoding modes further include a pyramid mode wherein bi-directional pictures in centers of the consecutive bi-directional pictures of the sub-groups are used as reference pictures of other bi-directional pictures.

16. The method of claim 1, wherein the plurality of encoding modes are classified according to whether the first bi-directional pictures are used as reference pictures of other pictures in the first sub-group and the reference pictures referred to by the first bi-directional pictures.

17. The apparatus of claim 6, wherein the plurality of encoding modes are classified according to whether the first bi-directional pictures are used as reference pictures of other pictures, and the reference pictures referred to by the first bi-directional pictures.

* * * * *